(12) United States Patent
Cho

(10) Patent No.: US 6,682,339 B2
(45) Date of Patent: Jan. 27, 2004

(54) FLAME STABILIZER FOR FLAME HYDROLYSIS DEPOSITION

(75) Inventor: Jae-Geol Cho, Suwon-shi (KR)

(73) Assignee: Samsung Electronic Co., Ltd., Suwon (KR)

( * ) Notice: Subject to any disclaimer, the term of this patent is extended or adjusted under 35 U.S.C. 154(b) by 0 days.

(21) Appl. No.: 10/046,798

(22) Filed: Jan. 15, 2002

(65) Prior Publication Data

US 2003/0017429 A1 Jan. 23, 2003

(30) Foreign Application Priority Data

Jul. 21, 2001 (KR) .......................... 2001-44004

(51) Int. Cl.[7] .............................. F23M 3/02; F23C 7/00; F23Q 9/00
(52) U.S. Cl. ...................... 431/8; 431/187; 431/284
(58) Field of Search ........................ 431/8, 187, 284, 431/285, 9

(56) References Cited

U.S. PATENT DOCUMENTS

| 4,877,396 | A | * | 10/1989 | Wunning | ..................... 431/158 |
|---|---|---|---|---|---|
| 5,202,303 | A | * | 4/1993 | Retallick et al. | ............. 502/439 |
| 5,267,850 | A | * | 12/1993 | Kobayashi et al. | ............. 431/8 |
| 5,411,395 | A | * | 5/1995 | Kobayashi et al. | ......... 431/187 |
| 5,628,181 | A | * | 5/1997 | Kraemer | ..................... 60/39.11 |
| 6,179,608 | B1 | * | 1/2001 | Kraemer et al. | ................ 431/9 |
| 6,190,158 | B1 | * | 2/2001 | Legiret et al. | ................. 431/8 |
| 6,230,635 | B1 | * | 5/2001 | Mukai et al. | ................ 110/347 |
| 6,250,915 | B1 | * | 6/2001 | Satchell et al. | ................ 432/19 |
| 6,328,940 | B1 | * | 12/2001 | Djavdan et al. | ............ 423/224 |

FOREIGN PATENT DOCUMENTS

| EP | 0185106 A1 | 6/1986 |
|---|---|---|
| EP | 0237183 A1 | 9/1987 |
| JP | 56026739 | 3/1981 |
| JP | 61044728 | 3/1986 |
| WO | WO 00/17115 | 3/2000 |

\* cited by examiner

Primary Examiner—Alfred Basichas
(74) Attorney, Agent, or Firm—Cha & Reiter, L.L.C.

(57) ABSTRACT

A flame stabilizing apparatus is disclosed for application to a burner for a flame hydrolysis deposition (FHD) process. In the flame stabilizing apparatus, a co-flow diffusion flame burner emits a flame onto a substrate and a flame stabilizer, installed around the burner coaxially, isolates the emitted flame from an instable ambient flow to stabilize the flame and a particle flow.

10 Claims, 4 Drawing Sheets

FIG. 1 [PRIOR ART]

FIG. 2 [PRIOR ART]

FLAME STABILIZER FOR FLAME HYDROLYSIS DEPOSITION

CLAIM OF PRIORITY

This application claims priority to an application entitled "Flame Stabilizer for Burner for Flame Hydrolysis Deposition" filed in the Korean Industrial Property Office on Jul. 21, 2001 and assigned Ser. No. 2001-44004, the contents of which are hereby incorporated by reference.

BACKGROUND OF THE INVENTION

1. Field of the Invention

The present invention relates generally to a fine particle fabricating burner using flame hydrolysis deposition (FHD), and in particular, to a flame stabilizer for a burner to stably form a thin film with fine particles to be used as a light waveguide on a wafer by flame.

2. Description of the Related Art

In general, FHD is a technology developed from fiber preform techniques and modified to produce planar waveguide geometry. A vapor mixture of halides (SiCl4, GeCl4, etc) is reacted in an oxy-hydrogen flame to form fine glass particles, which are deposited directly onto a suitable substrate, e.g., silicon. The high-silica technology offers the potential of integrating a number of passive functions on a silicon chip, as well as the possibility of hybrid integration of both active and passive devices onto a silicon motherboard.

Flame-using fine particle formation is performed by oxygen-hydrogen flames generated from a co-flow diffusion flame burner having a plurality of concentric nozzles. Being fed with flames, a source material forms fine particles by means of flame hydrolysis or oxidation. The fine particles migrate with the flames, grown by collision-caused coagulation, and adhere to a substrate in various forms by thermophoresis. The fine particles then are sintered and dried according to their use, for example, by OVD (Outside Vapor Deposition) or VAD (Vapor-phase Axial Deposition) in fabricating an optical fiber, and FHD in fabricating a planar optical waveguide thin film.

Planar optical waveguide technology has added the growth of the Internet and multimedia communications. These areas are also driving the demand for more and more capacity on networks, and the medium of choice for high-bandwidth is optical fiber. There are three technologies to increase the overall data rate in an optical link: space division multiplexing (SDM) using multiple fibers in parallel, time division multiplexing (TDM), i.e. higher bit rate per channel and fiber, and wavelength division multiplexing (WDM), i.e., more channels per fiber by making use of different wavelengths for the transport of data.

Long-haul backbone networks already use all three strategies to exploit the enormous bandwidth of the optical fiber. Transmission rates in the Terabit per second (Tb/s) range over more than 100 WDM channels have been demonstrated in laboratories around the world.

Planar optical waveguide technology, for example, enables functions such as adding and filtering out specific wavelengths to be performed efficiently and flexibly at low cost.

Figure 1:
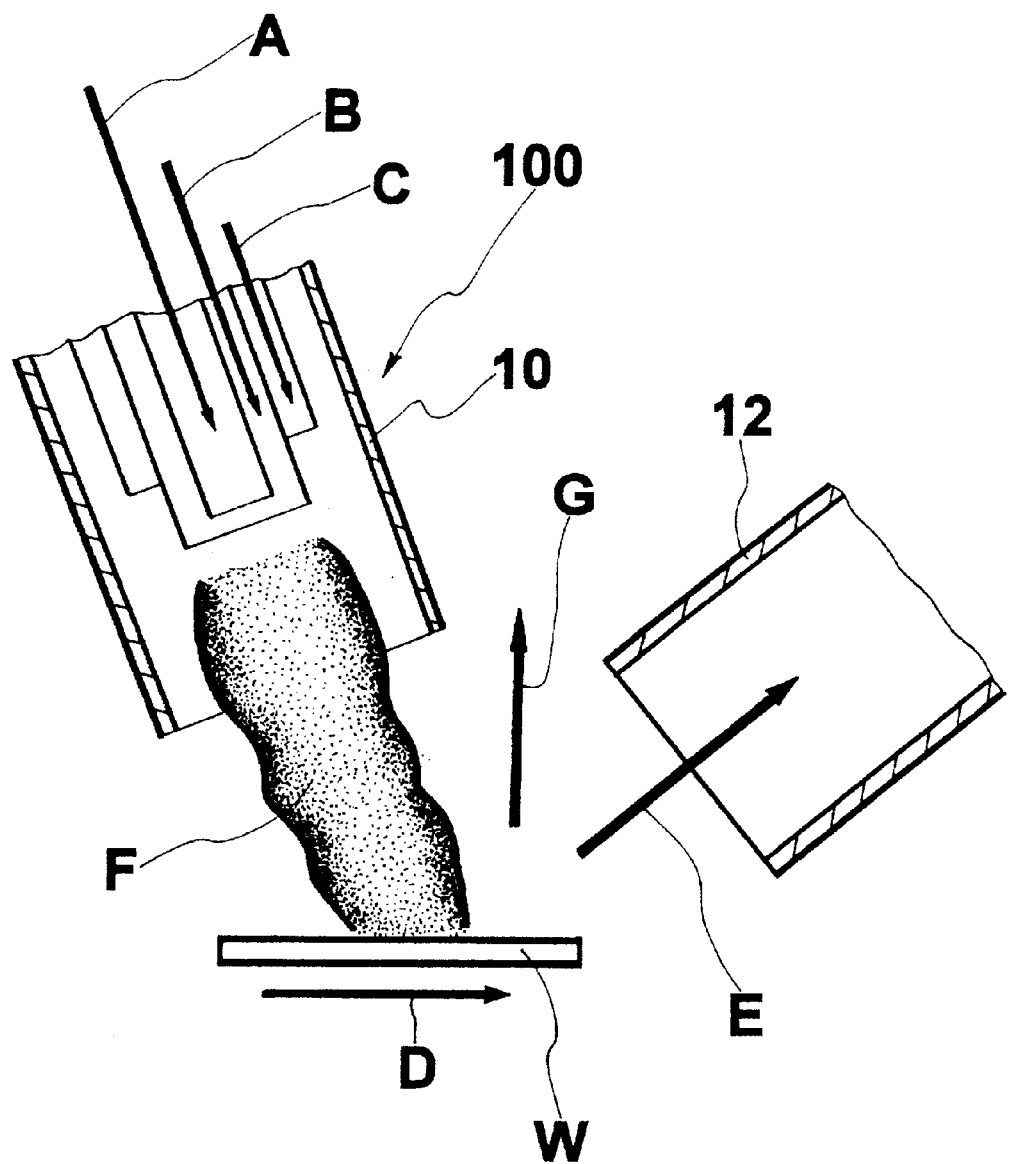
Figure 2:
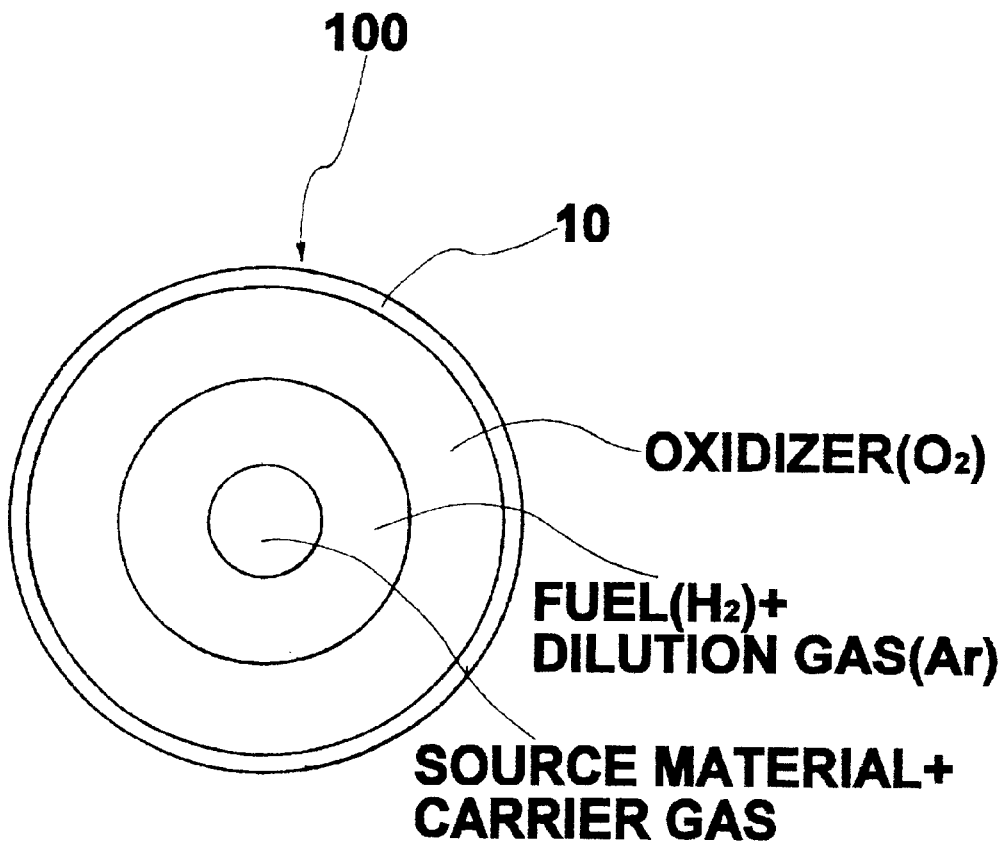
Figure 3:
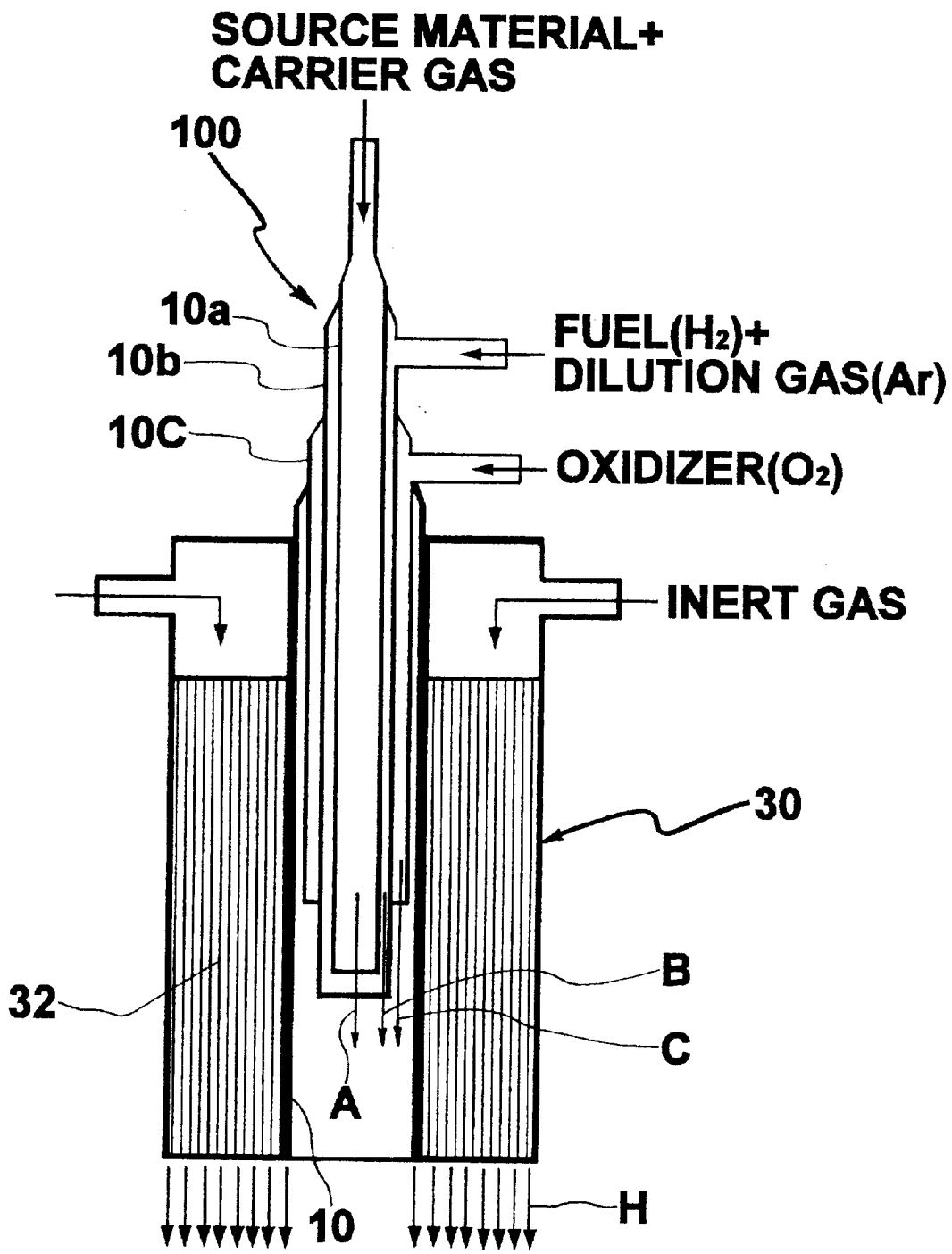
Figure 4:
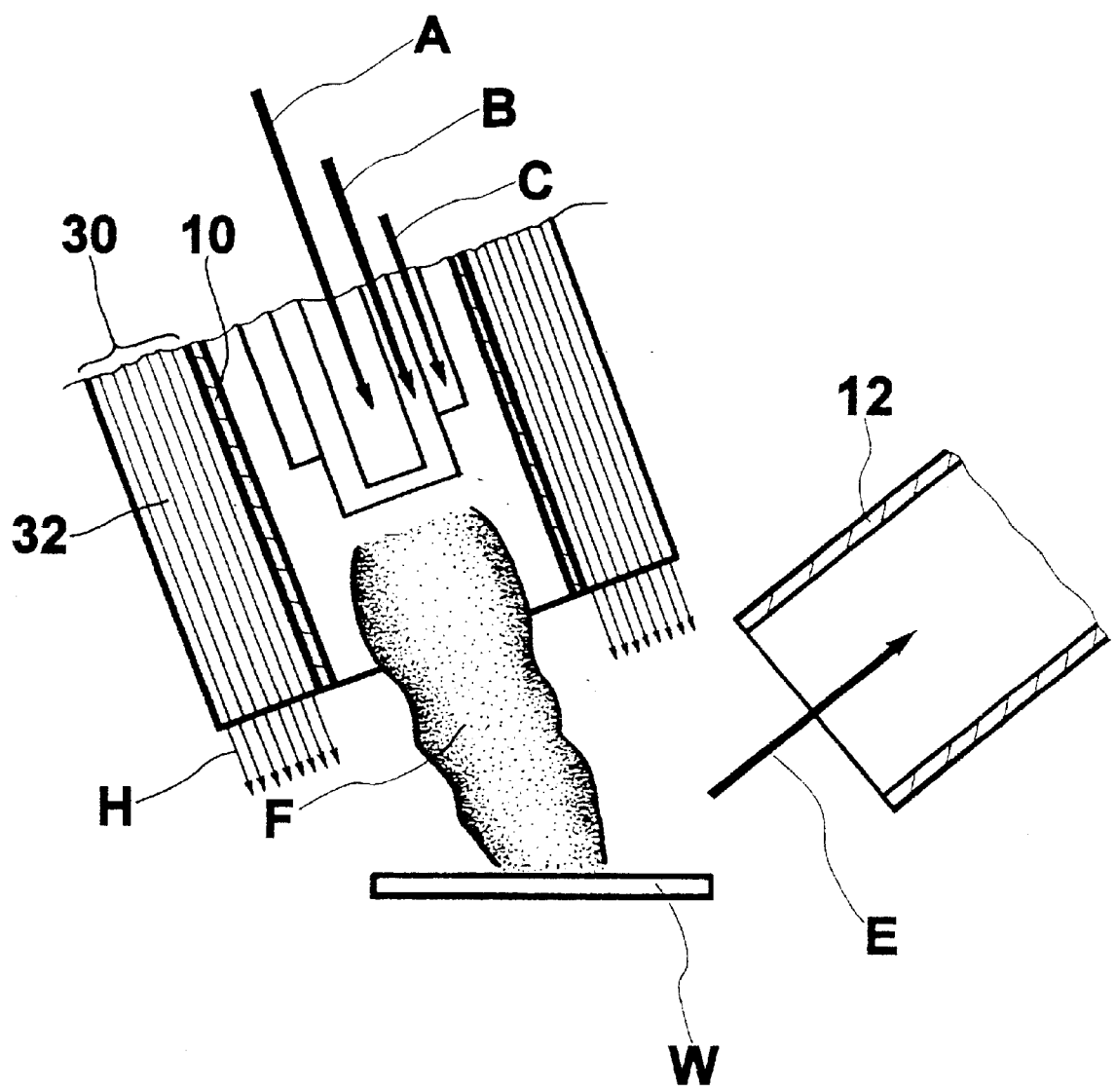

FIGS. 1 and 2 are schematic views of a co-flow diffusion flame burner 100 having a plurality of concentric nozzles for use in the conventional FHD process. The term 'diffusion flame' can imply that the fuel and oxidizer (air) gas streams mix together in a chemical reaction zone by mass diffusion.

Referring to FIGS. 1 and 2, a flame F is generated by spraying source materials and a carrier gas from the center of the co-flow diffusion flame burner 100 in a direction A, with combustion of hydrogen ($H_2$) and oxygen ($O_2$) outside the center, respectively in directions B and C. The source materials for forming particles usually include $SiCl_4$, $GeCl_4$, and $POCl_3$. Since these materials are liquid at room temperature, they are used after bubbling by the carrier gas. Hydrolysis occurs where $H_2O$ or OH resulting from the combustion of $H_2$ and $O_2$ meets the source materials diffused from the center of the burner 100. The resulting particles migrate with the flame F and stick to a silicon wafer W by thermophoresis.

The particles generated and grown in the flame F are as small as several nanometers to tens of nanometers. For particles this small, the influence of inertia can be neglected. The velocity of the particles in the flame F is the sum of the velocity of the gas and a thermophoretic velocity over a temperature gradient.

Therefore, in the case where the flow of the flame F is a laminar flow that can define a streamline, the particles in the flame F show a similar velocity distribution. On the other hand, if the flame flow is a turbulent flow with velocity fluctuation that cannot define a streamline, the particles in the flame F move at an unstable velocity along with the flow. As a result, the deposition efficiency and deposition uniformity of the particles is reduced.

The co-flow diffusion flame F generated from the burner 100 is generally unstable for two reasons. First, a shear flow is formed due to the velocity difference between the gases sprayed from the concentric nozzles and determined by process conditions, that is, formation of the flame F, source materials, and the flow rate of the carrier gas. The second reason is that entrainment of an ambient gas and a shear flow caused by the velocity and pressure differences between the flame F and the ambient gas. The entrainment of the ambient gas and the shear flow depend on the flow outside the flame F.

In the general FHD process, the flame F attracted by gravitation is positioned by rotation or linear movement over the silicon wafer W having a relative velocity in a direction D with respect to the burner 100. An exhaust flow is absorbed in a direction E into a discharge tube 12 for discharging non-deposited particles. The flame F exists in the vicinity of the flame F. A natural convection phenomenon is observed due to heating of the silicon wafer W and the flame F itself is influenced by buoyancy in a direction G. Hence, the flame F and the flow around the flame F are vulnerable to instability.

A flame shield tube 10 is usually provided to the periphery of the co-flow diffusion flame burner 100 to prevent introduction of ambient air and thus stabilize the flame F.

However, this method is not effective in fundamentally overcoming the instability of the flame F formed after passing through the flame shield tube 10. Therefore, high particle deposition efficiency and uniformity cannot be expected. Moreover, a vortex arising from an unstable flow causes contamination by allowing glass soot particles that are not deposited on the silicon wafer W to stick to the outside of the burner 100 or inside a deposition chamber. For at least these reasons, an improved burner design is needed

SUMMARY OF THE INVENTION

It is, therefore, an object of the present invention to provide an improved flame burner.

It is another object of the present invention to provide a flame stabilizer for a burner, which stabilizes a flow around a co-flow diffusion flame to prevent the disturbance of the flame and a particle flow in the flame caused by the ambient flow with increased particle deposition efficiency and stable and uniform particle deposition.

It is another object of the present invention to provide a flame stabilizer for a burner, which prevents the burner and a deposition chamber from being contaminated with glass soot due to a vortex and a flow disturbance around a flame.

The foregoing and other objects of the present invention are achieved by providing a flame stabilizing apparatus for application to a burner for an FHD process. In the flame stabilizing apparatus, a co-flow diffusion flame burner emits a flame onto a substrate and a flame stabilizer, installed around the burner coaxially, isolates the emitted flame from an instable ambient flow to stabilize the flame and a particle flow.

Another aspect of the present invention relates to a method for stabilizing a flame from an instable ambient flow and particle flow. The method includes the steps of inserting source materials into a center of a co-flow diffusion flame burner and inserting an inert gas that is not involved in flame hydrolysis through a plurality of channels juxtaposed to the center of the burner. The method also includes the step of allowing the insert gas to develop into a flow in the same direction as an emitted flame.

BRIEF DESCRIPTION OF THE DRAWINGS

The above and other objects, features and advantages of the present invention will become more apparent from the following detailed description when taken in conjunction with the accompanying drawings in which:

FIG. 1 is a schematic view of a conventional burner for FHD, illustrating formation of a thin film on a silicon wafer by spraying a flame from the burner;

FIG. 2 is a frontal view of the burner shown in FIG. 1;

FIG. 3 is a sectional view of a burner with a flame stabilizer according to a preferred embodiment of the present invention; and FIG. 4 is a schematic view of the burner with the flame stabilizer according to the preferred embodiment of the present invention, illustrating formation of a thin film on a silicon wafer by feeding a flame from the burner.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

FIG. 3 is a sectional view of a burner with a flame stabilizer according to a preferred embodiment of the present invention.

FIG. 4 is a schematic view of the burner with the flame stabilizer, illustrating formation of a thin film on a silicon wafer by spraying a flame from the burner.

Referring to FIGS. 3 and 4, a flame stabilizing apparatus includes the co-flow diffusion flame burner 100 and a flame stabilizer 30 for the burner 100. Source materials and a carrier gas for bubbling the source materials are sprayed from the center of the burner 100 in the direction A. The flame F is generated by combustion of a mixture of hydrogen and a diluting gas for temperature control in the direction B. As a oxidizer, oxygen flows in the direction C outside the center. Additionally, a flame shield tube 10 (see FIG. 4) is provided to prevent the introduction of air around the burner 100 and thus to stabilize the flame F.

The source materials for forming particles usually include $SiCl_4$, $GeCl_4$, $POCl_3$, and $BCl_3$.

The flame stabilizing apparatus according to one embodiment of the present invention includes the co-flow diffusion flame burner 100 and the flame stabilizer 30 around the burner 100. The flame stabilizer 30 sprays a gas to stabilize the flame F against an ambient flow. The flame stabilizer 30 is hollow and substantially surrounds the burner 100 coaxially. However, it should be noted that other configurations may also used as long as they are juxtaposed to the center of the co-flow diffusion flame burner 100. For example, the flame stabilizer 30 need not completely surround the burner 100. Also, the outer shape of the flame stabilizer 30 may vary.

More specifically, the flame stabilizer 30 is composed of a plurality of preferably ceramic honeycomb tubes 32, which are stacked in the outer circumferential direction. Other configurations for the flame stabilizer 30 may also be used, e.g. a plurality of channels or multi-branching passages. In addition, other flame retardant and/or resistant materials may be used other than ceramic. The diameter of the plurality of tubes 32 need not be the same at both ends. It is also noted that a plurality of cross-sectional shapes can be used for the honeycomb tubes, e.g., circular, square, oval, hexagon, etc. The tubes 32 may be arranged in a random pattern or stacked in a grid-like array pattern.

In operation, the flame stabilizer 30 sprays inert gases (see FIG. 4) that are not involved in flame hydrolysis, such as $O_2$, $N_2$, Ar, He, etc. through the ceramic honeycomb tubes 32 (Shown in FIG. 5). Passing through the small diameter (relative to the diameter of the flame shield tube 10) honeycomb tubes 32, the inert gases become fully developed flow. Then, the fully developed inert gases have only a velocity component in the same direction as that in which the flame F is emitted at the outlet of the flame stabilizer.

This arrangement causes a velocity component perpendicular to the flame emitting direction to be removed from the fully developed inert gases. If the inert gases are directed in multiple layers in a direction H around the flame F, the flows in the direction perpendicular to the flame emitting direction, caused by the introduction of stationary air, can be blocked or minimized. Also, the instability of the flame F due to a shear flow and a suction flow caused by the relative velocity difference in the direction D between the silicon wafer W and the burner 100 can be minimized.

In particular, spraying, forcing or inserting the inert gases around the flame F from the co-flow diffusion flame burner 100 through the multi-layered honeycomb tubes 32 prevents the flame F from the instability caused by the natural convection and the suction flow. It should be understood by one of ordinary skill in the art that the burner 100 with the flame stabilizer 30 shown in FIG. 4 is a sectional view in flame F emitting direction, and the stabilizer 30 surrounds the burner 100 coaxially.

As described above, in application to a co-flow diffusion flame burner for FHD, the inventive flame stabilizing apparatus uses a flame stabilizer for spraying inert gases with a velocity in the flame emitting direction in multiple layers around a flame. This has the effect of removing instability caused by factors other than the flame and thus maintaining the flame and a particle flow in the flame at the state of a laminar flow. Consequently, the thermophoresis effect with respect to a temperature gradient is maximized and the particle mass deposited on a silicon wafer and particle deposition uniformity are increased when source materials of the same mass are used. Furthermore, suppression of flow disturbance around the flame prevents contamination of the FHD burner and a deposition chamber with glass soot. The resulting obviation of periodical cleansing of the burner prevents damages to the burner and reproducibility deterioration.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A flame stabilizing apparatus comprising:
    a co-flow diffusion flame burner for emitting a flame onto a substrate in a flame hydrolysis deposition (FHD) process; and
    a flame stabilizer juxtaposed to the burner for isolating the emitted flame from an unstable ambient flow by blocking air flow in a substantially perpendicular direction relative to a direction of the emitted flame to stabilize the emitted flame and a particle flow by emitting an inert gas that is not involved in flame hydrolysis in substantially the same direction of the flame to surround at least a portion of the flame.

2. The flame stabilizing apparatus of claim 1, wherein the flame stabilizer is positioned around the burner coaxially.

3. The flame stabilizing apparatus of claim 2, wherein the flame stabilizer includes a plurality of channels and emits a gas in a fully developed flow around the flame through the channels.

4. The flame stabilizing apparatus of claim 3, wherein the channels are honeycomb tubes.

5. The flame stabilizing apparatus of claim 4, wherein the honeycomb tubes are stacked in at least one layer along the outer circumferential direction.

6. The flame stabilizing apparatus of claim 1, wherein the flame stabilizer is formed of ceramic.

7. The flame stabilizing apparatus of claim 1, wherein the inert gas includes oxygen, nitrogen, argon, and helium having only a velocity component in the same direction as the emitted flame so that the inert gas blocks ambient air flow other than from said flame stabilizer from reaching the emitted flame.

8. The flame stabilizing apparatus of claim 1, wherein the flame stabilizer surrounds the outer circumference of the burner and sprays a gas in the same direction as that in which the flame is emitted.

9. A flame stabilizing apparatus comprising:
    a co-flow diffusion flame burner for emitting a flame onto a substrate in a flame hydrolysis deposition (FHD) process; and
    flame stabilizer means for isolating the emitted flame from an unstable ambient flow to stabilize the flame by blocking air flow in a substantially perpendicular direction relative to a direction of the emitted flame and a particle flow by emitting an inert gas that surrounds the emitted flame and that is not involved in flame hydrolysis.

10. A method for stabilizing a flame from an unstable ambient flow and particle flow, said method comprising the steps of:
    inserting source materials into a center of a co-flow diffusion flame burner;
    inserting an inert gas by a flame stabilizer that is not involved in a flame hydrolysis through a plurality of channels juxtaposed to the center of the burner; and
    allowing the inert gas to develop into a flow in the same direction as an emitted flame to blocking air flow in a substantially perpendicular direction relative to a direction of the emitted flame.

* * * * *